(12) United States Patent
Iwashita et al.

(10) Patent No.: US 8,026,689 B2
(45) Date of Patent: Sep. 27, 2011

(54) CONTROL DEVICE FOR MACHINE TOOL

(75) Inventors: Yasusuke Iwashita, Yamanashi (JP);
Tadashi Okita, Yamanashi (JP); Junichi Tezuka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/761,191

(22) Filed: Apr. 15, 2010

(65) Prior Publication Data

US 2010/0264867 A1 Oct. 21, 2010

(30) Foreign Application Priority Data

Apr. 17, 2009 (JP) ................. 2009-101275

(51) Int. Cl.
G05B 11/01 (2006.01)

(52) U.S. Cl. ......... 318/635; 318/565; 318/561; 318/571

(58) Field of Classification Search ......... 318/565, 318/635, 571, 572, 561; 700/188, 159; 702/865.9; 451/28; 73/865.9
See application file for complete search history.

(56) References Cited

U.S. PATENT DOCUMENTS

| | | | | |
|---|---|---|---|---|
| 4,053,289 | A | * 10/1977 | Tatsumi | 451/28 |
| 4,279,013 | A | * 7/1981 | Cameron et al. | 700/33 |
| 4,748,554 | A | * 5/1988 | Gebauer et al. | 700/174 |
| 6,260,427 | B1 | * 7/2001 | Jones et al. | 73/865.9 |
| 6,308,138 | B1 | * 10/2001 | Jones et al. | 702/34 |

FOREIGN PATENT DOCUMENTS

| | | |
|---|---|---|
| JP | 56082909 | 7/1981 |
| JP | 56082909 A | 7/1981 |
| JP | 61180530 A | 8/1986 |
| JP | 64063745 | 3/1989 |
| JP | 3265428 | 11/1991 |
| JP | 3265428 A | 11/1991 |
| JP | 6161535 A | 6/1994 |
| JP | 9185796 | 7/1997 |
| JP | 9185796 A | 7/1997 |
| JP | 11221739 | 8/1999 |
| JP | 11221739 A | 8/1999 |
| JP | 2002-092087 A | 3/2002 |
| JP | 2002092087 | 3/2002 |
| JP | 2002-291274 A | 10/2002 |
| JP | 2002291274 | 10/2002 |
| JP | 2006-172277 A | 6/2006 |
| JP | 2006172277 | 6/2006 |
| JP | 2006-277131 A | 10/2006 |
| JP | 2006277131 | 10/2006 |

OTHER PUBLICATIONS

Notice of Reasons for Rejection for Application No. JP 2009-101275, issued Aug. 10, 2010.

* cited by examiner

*Primary Examiner* — Paul Ip
(74) *Attorney, Agent, or Firm* — Lowe Hauptman Ham & Berner, LLP (57) ABSTRACT

A control device for a machine tool including a feed axis driving motor; a first power consumption calculating portion calculating power consumption of the feed axis driving motor; a second power consumption calculating portion calculating power consumption of equipment adapted to be operated by constant power; and a motor control portion determining a target time constant correlated with at least one of acceleration time and deceleration time of the feed axis driving motor, based on a summation of the power consumption calculated by the first power consumption calculating portion and the power consumption calculated by the second power consumption calculating portion, and controlling the feed axis driving motor based on the target time constant.

3 Claims, 7 Drawing Sheets

| NUMBER | k1 | k2 |
|---|---|---|
| 1 | 0.1 | 0.9 |
| 2 | 0.2 | 0.8 |
| 3 | 0.3 | 0.7 |
| 4 | 0.4 | 0.6 |
| 5 | 0.5 | 0.5 |
| 6 | 0.6 | 0.4 |
| 7 | 0.7 | 0.3 |
| 8 | 0.8 | 0.2 |
| 9 | 0.9 | 0.1 |

CONTROL DEVICE FOR MACHINE TOOL

RELATED APPLICATIONS

The present application is based on, and claims priority from, Japanese Application Number 2009-101275, filed Apr. 17, 2009, the disclosure of which is hereby incorporated by reference herein in its entirety.

BACKGROUND OF THE INVENTION

1. Field of the Invention

The present invention relates to a control device for controlling a machine tool, such as a machining center, etc.

2. Description of the Related Art

A device for reducing power consumption during machining of a workpiece is wellknown. The device described in Japanese Unexamined Patent Publication (kokai) No. 6-161535 (JP6-161535A) is configured to extend acceleration time of an axis-feed servomotor so as to reduce a maximum value of required current, and thus reduces power consumption.

In such a machine tool, not only the axis-feed motor but also equipment which operate at a constant power, such as an oil pump for supplying cutting oil, etc., is driven at the same time during machining of a workpiece. Therefore, in the device described in JP6-161535A, in which acceleration time of the servomotor is extended, it is difficult to optimally reduce total power consumption expended by the machine tool, because the cycle time increases, and thereby the power consumption of the above mentioned equipment increases.

SUMMARY OF THE INVENTION

One aspect of the present invention provides a control device of a machine tool including a feed axis driving motor; a first power consumption calculating portion calculating power consumption of the feed axis driving motor; a second power consumption calculating portion calculating power consumption of equipment adapted to be operated by constant power; and a motor control portion determining a target time constant correlated with at least one of acceleration time and deceleration time of the feed axis driving motor, based on a summation of the power consumption calculated by the first power consumption calculating portion and the power consumption calculated by the second power consumption calculating portion, and controlling the feed axis driving motor based on the target time constant.

BRIEF DESCRIPTION OF THE DRAWINGS

The objects, features and advantages of the present invention will become more apparent from the following description of the preferred embodiments in connection with the accompanying drawings, wherein.

DETAILED DESCRIPTION

Figure 1:
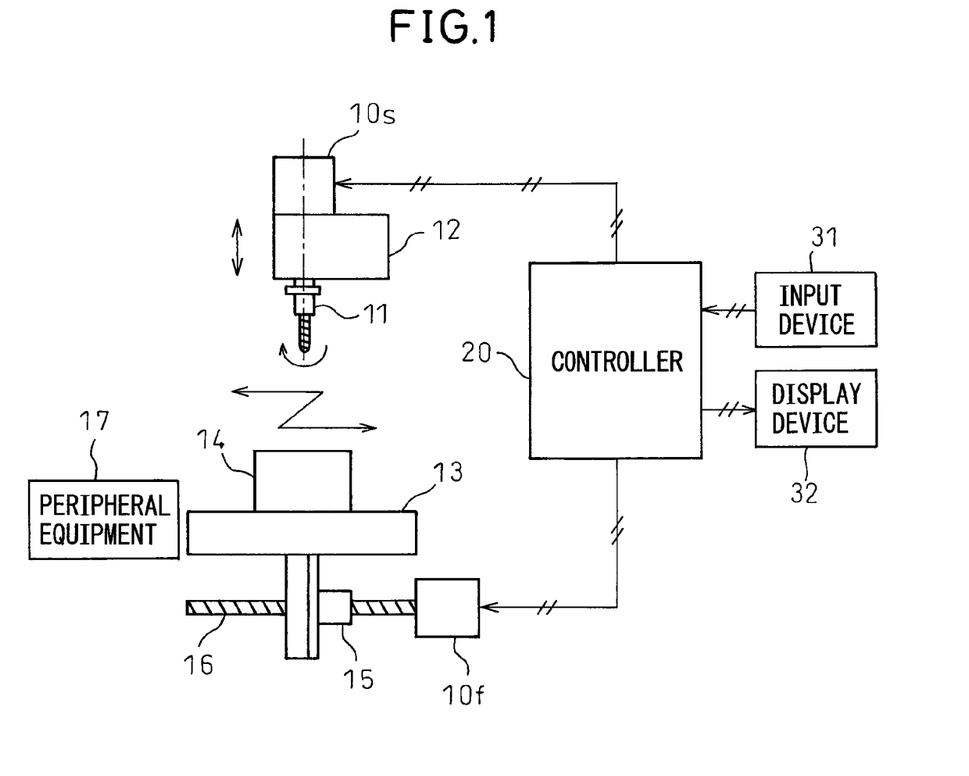
FIG. 1 is a schematic view generally showing a machine tool to which a control device according to an embodiment of the present invention is applied.

The embodiments of the present invention are described below, referring to FIGS. 1 to 8. FIG. 1 schematically illustrates the entire structure of a machine tool to which the embodiment of the invention is applied.

The machine tool shown in FIG. 1 is a so-called vertical-type machining center of which a spindle extends in the vertical direction. The spindle is rotated by a spindle motor $10s$, and a tool 11 is rotated by the rotation of the spindle motor $10s$. The tool 11 is a cutting tool such as an end mill, a cutter, or a drill, etc., or a grinding tool, and is detachably attached to a spindle head 12. A table 13 lies below the tool 11 and a workpiece 14 is fixed on the table 13.

A ball screw 16 is threadably engaged in the table 13 by a nut 15. The ball screw 16 is rotated by a feed axis motor $10f$, so that the table 13 is moved in a horizontal direction (for example, X-Y directions). The same feeding mechanism (not shown) is also provided on the spindle side, so that the spindle head 12 is moved in the vertical direction (Z direction) by the feed axis motor $10f$. More specifically, a plurality of feed axis motors $10f$ are provided corresponding to the directions of three orthogonal feed axis (X-Y-Z directions) in the machine tool, so that the workpiece 14 is moved relative to the tool 11 by the feed axis motors $10f$.

The spindle motor $10s$ is comprised of an AC spindle motor, and the feed axis motor $10f$ is comprised of an AC servomotor, which are driven by the power supplied from a power source via an amplifier. However, the spindle driving motor $10s$ and the feed axis driving motor $10f$ are not limited thereto. The power supplied from the power source is also supplied to peripheral equipment 17, such as an oil pump for supplying cutting oil, etc. The peripheral equipment 17 operates at a constant power while the workpiece 14 is machined.

The spindle motor $10s$ and the feed axis motor $10f$ are driven under a control of a controller 20. The controller 20 includes an arithmetic processing unit having CPU, ROM, RAM, and other peripheral circuits, etc. An input device 31 to input various instructions relating to the machining of the workpiece 14 and a display device 32 to display various information based on the processes executed in the controller 20 are connected to the controller 20. The input device 31 can be comprised of a keyboard or a touch panel, etc.

Figure 2:
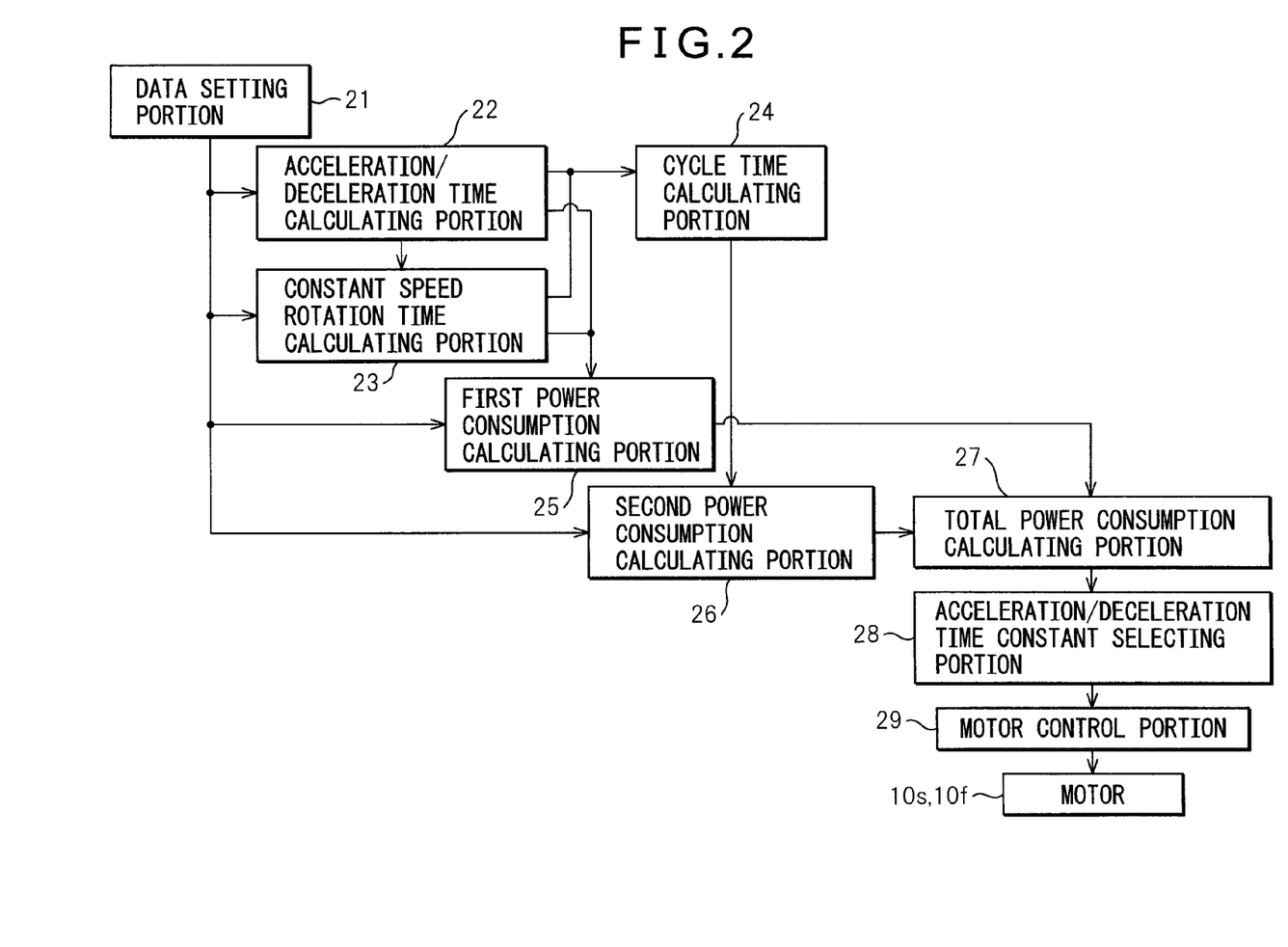
FIG. 2 is a block diagram showing the constitution of the control device according to the embodiment of the present invention.

FIG. 2 is a block diagram showing a constitution of the control device according to the embodiment of the present invention, and mainly shows an internal constitution of the controller 20. According to the instructions from the input device 31, a data setting portion 21 sets various data such as feed speed vf of the feed shaft (a target feed axis speed), target displacement X, rotational speed of the spindle vs (target spindle speed), an initial time constant, motor-specific physical properties, friction torques of the spindle and the feed shaft, power P0 per unit time consumed by the peripheral equipment 17, etc. as well as the data contained in the machining program. Speed, displacement, time constant, etc., may be set as a machining program. The target feed axis speed vf and the target spindle speed vs are also respectively referred to as set speeds.

Figure 3:
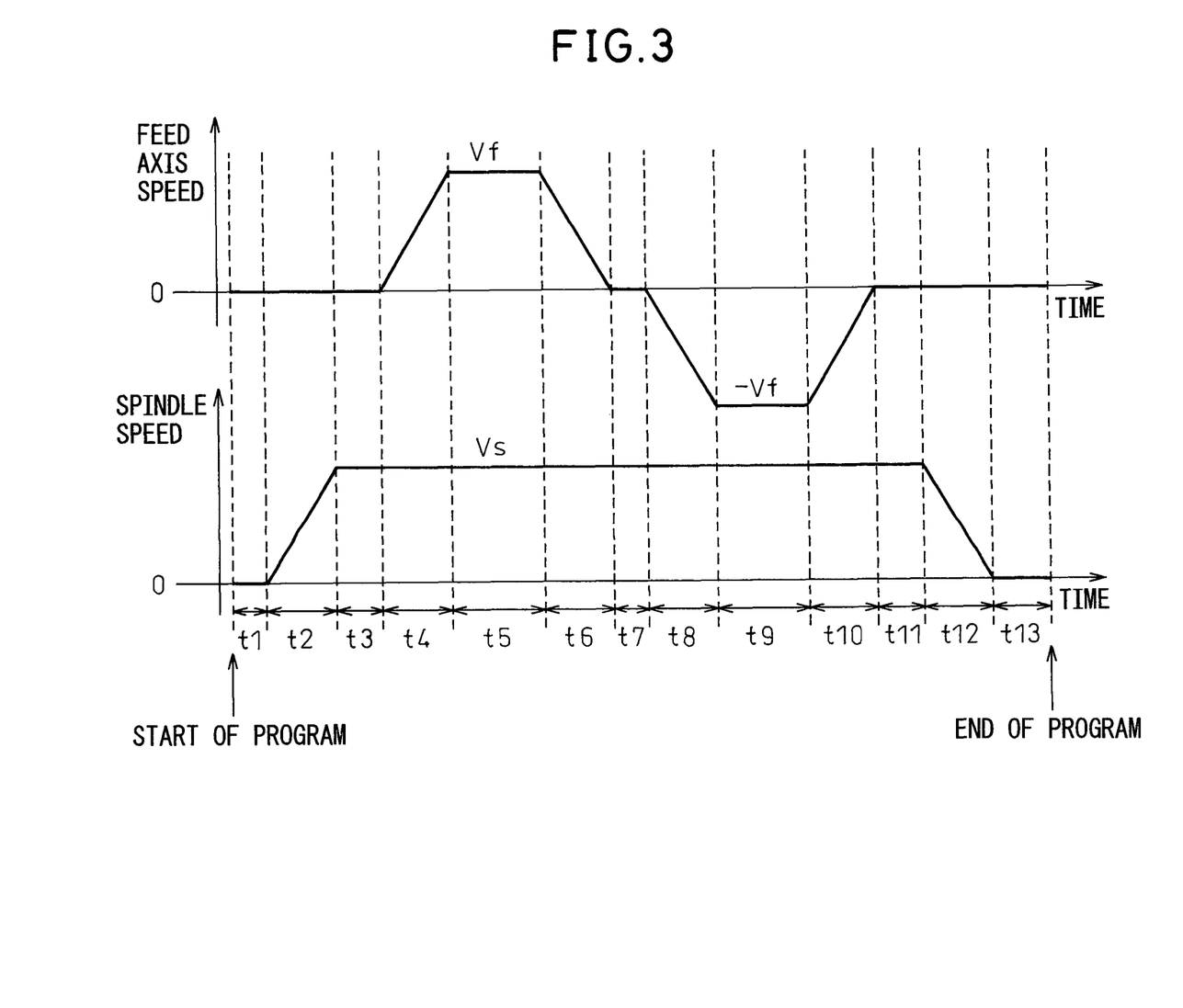
FIG. 3 is a timing chart showing an example of the machining program of the control device according to the embodiment of the present invention.

FIG. 3 is a timing chart showing an example of the machining program set by the data setting portion 21. In FIG. 3, a cycle time T from the beginning of the machining program to the end thereof is drawn divided into t1 to t13. More specifically, in FIG. 3, the spindle is driven after time t1 from the beginning of the machining program, and the spindle speed reaches the set speed vs after the lapse of time t2. The feed shaft is driven in one direction after the lapse of time t3, and the feed axis speed reaches the set speed vf after the lapse of time t4. After that, the feed shaft is decelerated after being driven for time t5 at the set speed vf, and is stopped after the lapse of time t6. After time t7, the feed shaft is driven in the reverse direction, and the feed axis speed reaches the set sped −vf after the lapse of time t8. After that, the feed shaft is decelerated after being driven for time t9 at the set speed −vf, and is stopped after the lapse of time t10. On the other hand, the spindle is decelerated after being driven for time t11, is stopped after the lapse of time t12, and the machining program ends after the lapse of time t13.

In this embodiment, the acceleration times t4 and t8 and the deceleration times t6 and t10 of the feed shaft are all set to be equal, and the times t5 and t9 in which the feed shaft is driven respectively at the set speed vf and −vf (constant speed time) are set to be equal to each other. The acceleration time t2 and the deceleration time t12 of the spindle are also set to be equal to each other.

Hereafter, the time necessary for the feed axis speed to reach the set speed vf is defined as a acceleration/deceleration time constant tf, and the time necessary for the spindle speed to reach the set speed vs is defined as a acceleration/deceleration time constant ts. In the example shown in FIG. 3, the acceleration/deceleration time constant tf is equal to the acceleration/deceleration times t4, t6, t8, and t10 and the acceleration/deceleration time constant ts is equal to the acceleration/deceleration times t2 and t12. The acceleration/deceleration time constants tf and ts can be simply referred to hereinafter as time constants. The acceleration/deceleration time constants tf and ts are determined considering the total power consumption expended by the machine tool, as described below.

Using the acceleration/deceleration time constants tf and ts, an acceleration of the feed axis is represented by vf/tf and an acceleration "as" of the spindle is represented by vs/ts. Namely, the acceleration of is variable using the acceleration/deceleration time constant tf as parameter, and the acceleration "as" is variable using the acceleration/deceleration time constant ts as parameter. The acceleration/deceleration times t2, t4, t6, t8, t10, and t12 and the constant speed times t5 and t9 illustrated in FIG. 3 are determined according to the acceleration/deceleration time constants tf and ts, whereas the other times t1, t3, t7, tll, and t13 are set as predetermined fixed times.

An acceleration/deceleration time calculating portion 22 in FIG. 2 calculates an acceleration/deceleration time tf1 of the feed shaft and an acceleration/deceleration time ts1 of the spindle, using the data from the data setting portion 21, as follows. A constant speed rotation time calculating portion 23 calculates a constant speed time tf2 of the feed shaft and a constant speed time ts2 of the spindle, using the data from the data setting portion 21 and the acceleration/deceleration time calculating portion 22.

Figure 4A:
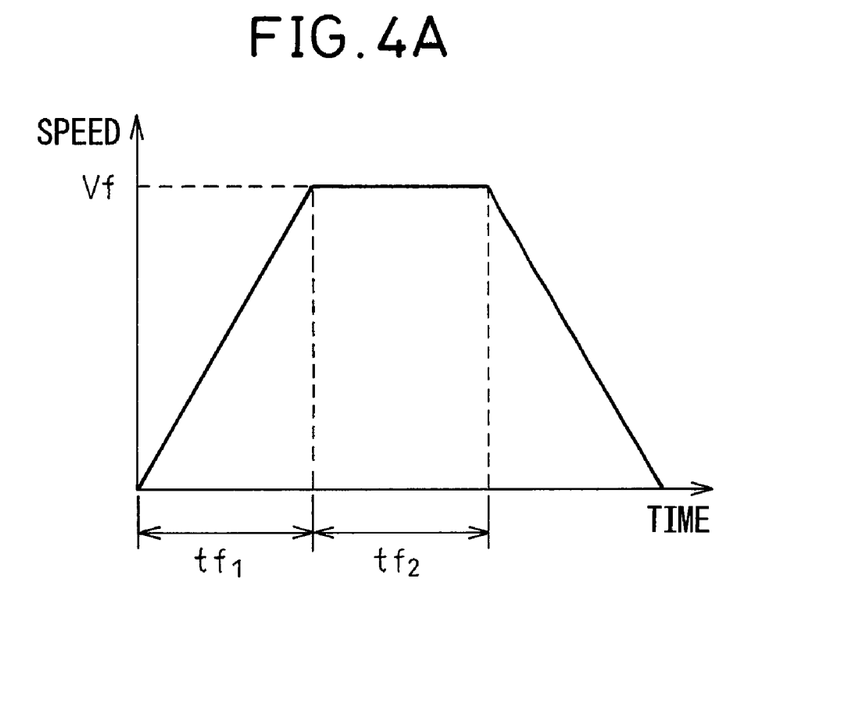
FIG. 4A is a timing chart showing a pattern of the machining program.

Using the acceleration of (mm/sec$^2$), the displacement X (mm), the set speed vf (mm/sec) of the feed shaft, when the feed axis speed has reached the set speed vf as shown in FIG. 4A, namely, when the displacement X is large, and X>vf$^2$/af, the acceleration/deceleration time tf1 and the constant speed time tf2 of the feed shaft are calculated by the following formulae (I).

$$tf1=vf/af$$

$$tf2=X/vf-vf/af \quad (I)$$

Figure 4B:
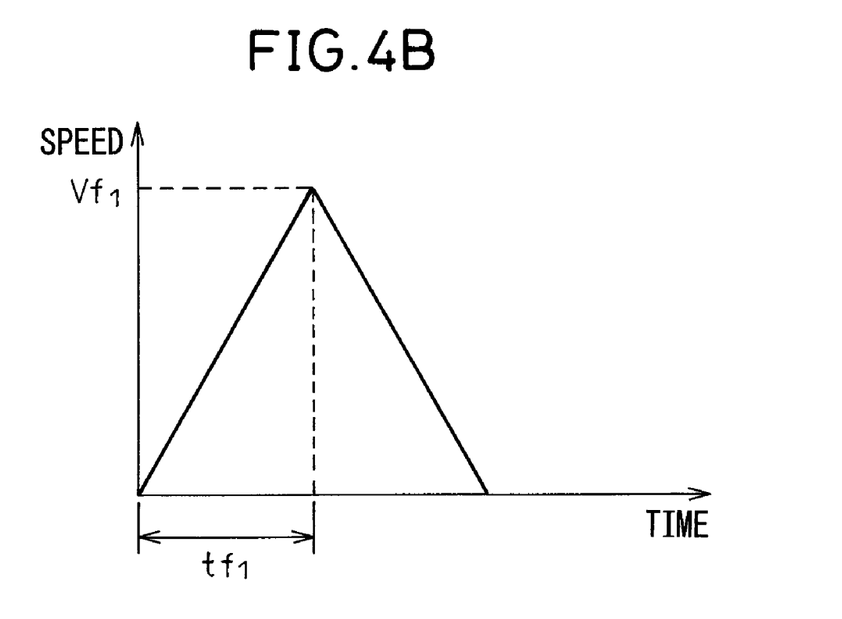
FIG. 4B is a timing chart showing a pattern of the machining program different from FIG. 4A.

On the other hand, when the feed axis speed has not reached the set speed vf as shown in FIG. 4B, namely, when the displacement X is small, and X≦vf$^2$/af, the acceleration/deceleration time tf1 and the maximum speed vf1 of the feed shaft are calculated by the following formulae (II).

$$tf1=\text{sqrt}(X/af)$$

$$vf1=\text{sqrt}(X*af) \quad (II)$$

Using the acceleration "as" (rad/sec$^2$) and the set speed vs (rad/sec) of the spindle, the acceleration/deceleration time ts1 of the spindle is calculated by the following formula (III).

$$ts1=vs/as \quad (III)$$

The constant speed time ts2 of the spindle is calculated by the addition of the acceleration/deceleration time tf1 and the constant speed time tf2 of the feed shaft, and the predetermined fixed times (t3, t7, and t11 in FIG. 3) in the cycle time T.

A cycle time calculating portion 24 in FIG. 2 calculates the machining cycle time T (t1 to t13 in FIG. 3) based on the signals from the acceleration/deceleration time calculating portion 22 and the constant speed rotation time calculating portion 23. The cycle time T is calculated taking into the predetermined machining program. In the example shown in FIG. 3, the cycle time T is calculated by adding the acceleration/deceleration time tf1 of the feed shaft and the acceleration/deceleration time ts1 of the spindle, the constant speed time tf2 of the feed shaft, and the fixed times (t1, t3, t7, t11, and t13), or by adding the acceleration/deceleration time ts1 of the spindle, the constant speed time ts2 of the spindle, and the fixed times (t1 and t13).

A first power consumption calculating portion 25 predicts power consumptions of the motors 10f and 10s, based on the signals from the data setting portion 21, the acceleration/deceleration time calculating portion 22, and the constant speed rotation time calculating portion 23, as follows. As the motor-specific physical properties, the winding resistance (for one phase) of the feed axis motor 10f is R (Ω), the torque constant is Kt (Nm/A), the load inertia is J (kgm$^2$), the number of rotations of the feed axis motor 10f at the set speed of is ω (rad/sec), and the friction torque of the feed shaft is Tf (Nm). The current I (A) of the feed axis motor 10f on acceleration is then, calculated by the following formula (IV).

$$I=(J\times a)/Kt \quad (IV)$$

When the motor loss is only the copper loss, power consumption Ea (Ws) of the feed axis motor 10f on acceleration is calculated by the following formula (V), using the acceleration/deceleration time tf1.

$$Ea = 1/2 \times J \times \omega^2 + 3 \times R \times I^2 \times tf1 \quad (V)$$

$$= J*\omega^2/2 + (3R*J^2*\omega/Kt^2)\times a$$

Power consumption Ed (Ws) of the feed axis motor 10f on deceleration is calculated by the following formula (VI), where the rate of recovery of the kinetic energy is expressed as coefficient Kr.

$$Ed = -1/2 \times J \times \omega^2 \times Kr + 3 \times R \times I^2 \times tf1 \quad \text{(VI)}$$
$$= -J * Kr * \omega^2 / 2 + (3R * J^2 * \omega / Kt^2) \times a$$

When the feed axis motor 10f rotates at a constant speed, power consumption Ec is calculated by the following formula (VII), using the constant speed time tf2.

$$Ec = Tf \times \omega \times tf2 + 3 \times R \times (Tf/Kt)^2 \times tf2 \quad \text{(VII)}$$
$$= Tf * \omega * tf2 + 3R * tf2 \times (Tf/Kt)^2$$

When there are plural acceleration periods, deceleration periods, and constant speed periods in the cycle time T, the power consumptions in the respective periods are added, then power consumption Em of the feed axis motor 10f is calculated by the following formula (VIII).

$$Em = \Sigma Ea + \Sigma Ed + \Sigma Ec \quad \text{(VIII)}$$

Power consumption Em of the spindle motor 10s is calculated in the same way.

A second power consumption calculating portion 26 predicts power consumption E0 (Ws) of the peripheral equipment 17 in the cycle time T, based on the signals from the data setting portion 21 and the cycle time calculating portion 24. The power consumption E0 is calculated by the following formula (IX), where the power consumption of the peripheral equipment 17 is expressed as P0 (W).

$$E0 = P0 \times T \quad \text{(IX)}$$

A total power consumption calculating portion 27 calculates the total power consumption E of the machine tool, as a whole, in the cycle time T, based on the signals from the first power consumption calculating portion 25 and the second power consumption calculating portion 26. When a plurality of motors are provided as in the embodiment, the power consumption Em of the respective motors 10f and 10s are added, then the total power consumption E is calculated by the following formula (X).

$$E = \Sigma Em + E0 \quad \text{(X)}$$

Figure 5:
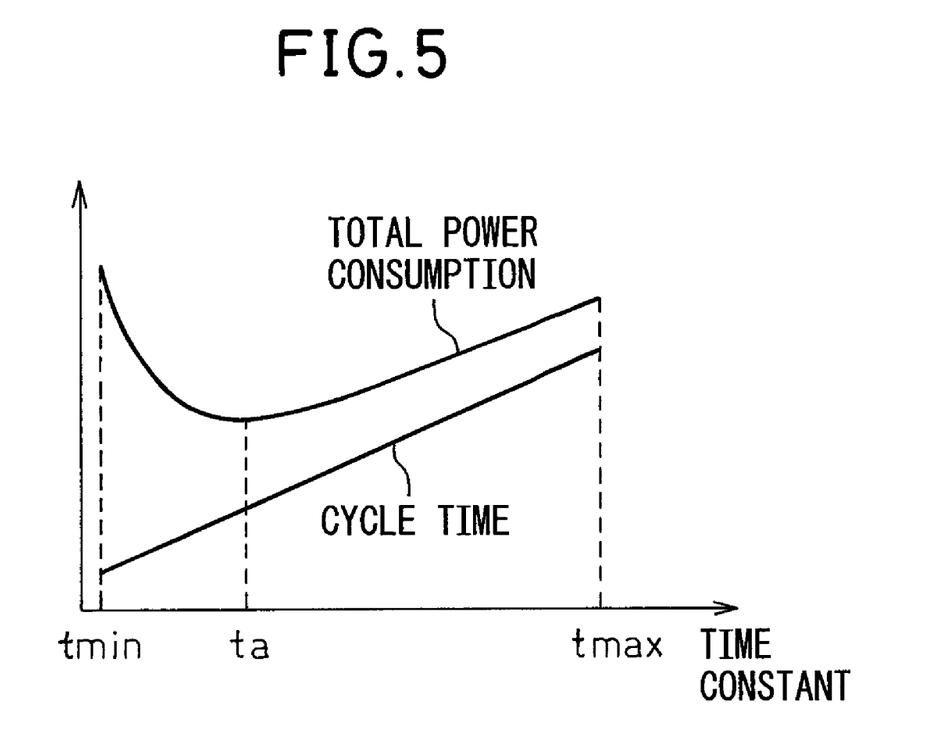
FIG. 5 is a diagram showing a relationship between a acceleration/deceleration time constant and a cycle time, and a total power consumption, which are obtained by the control device according to the embodiment of the present invention.

In an acceleration/deceleration time constant selecting portion 28, a target time constant ta to minimize the total power consumption E is determined. FIG. 5 is a diagram showing a relationship between the acceleration/deceleration time constant tf of the feed axis motor 10f, the cycle time T, and the total power consumption E. This relationship is obtained by the acceleration/deceleration time constant selecting portion 28, which varies the acceleration/deceleration time constant tf in a predetermined intervals Δt from a lower limit value tmin to a upper limit value tmax predetermined in the data setting portion 21, and calculates the total power consumption E and the cycle time T for every time constant tf, as described above. The tmin, tmax, and Δt are determined, for example, experientially, according to the machining conditions, etc. As shown in the diagram, the total power consumption E is indicated by a downwardly convex curve and the cycle time T is represented by a line inclined upward in accordance with the increase of the time constant. The target time constant ta to minimize the total power consumption E is determined from the diagram. For the spindle motor 10s, the target time constant ta is determined in the same way.

A motor control portion 29 in FIG. 2 controls each motor based on the target time constant ta determined by the acceleration/deceleration time constant selecting portion 28. More specifically, the motor control portion 29 sets the acceleration/deceleration times tf1 and ts1 and the constant speed times tf2 and ts2 using the target time constant ta so as to calculate an acceleration/deceleration pattern. Then, the motor control portion 29 outputs control signals to the respective motors 10f and 10s based on the calculated acceleration/deceleration pattern so as to control the motors 10f and 10s during the machining of the workpiece.

Figure 6:
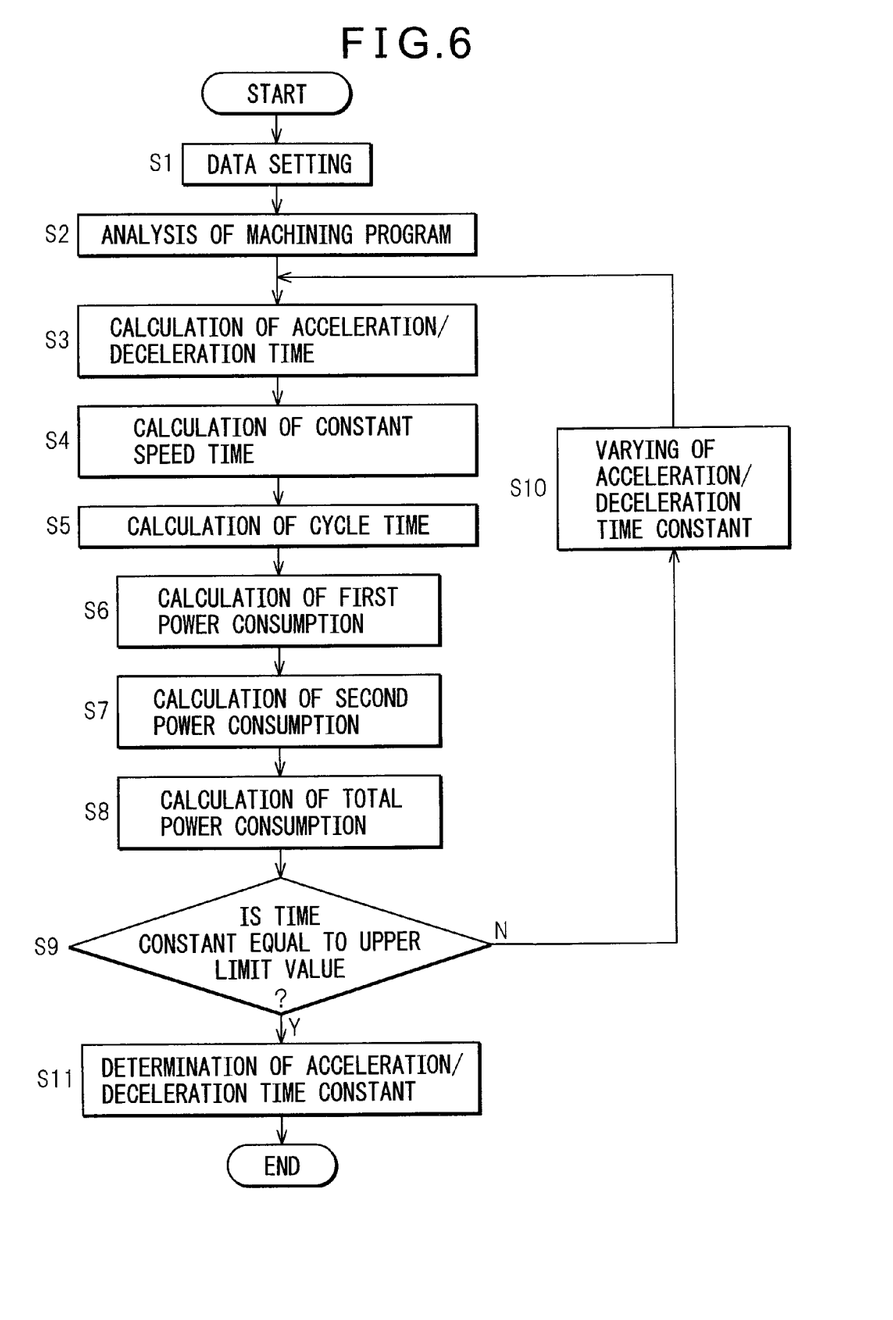
FIG. 6 is a flowchart showing an example of the processing executed in the controller shown in FIG. 1.

FIG. 6 is a flowchart showing an example of a processing executed in the CPU of the controller 20, specifically, the processing to set the acceleration/deceleration time constants tf and ts. The processing shown in the flowchart is executed before the machining operation of the workpiece 14. For example, when a time constant setting command is inputted from the input device 31, the processing is started. In the initial state, the acceleration/deceleration time constants tf and ts are set to the lower limit value tmin.

At step S1, various data necessary for setting the acceleration/deceleration time constants tf and ts are set. This processing is executed by the data setting portion 21, and the set data includes the target feed shaft speed vf, the target displacement X, the target spindle speed vs, the motor-specific physical properties (the winding resistance R, the torque constant Kt, the load inertia J, of the motor, etc.), the friction torque Tf of the spindle and the feed shaft, the power P0 consumed by the peripheral equipment 17 per unit time, etc.

At step S2, the machining program (FIG. 3) is analyzed to obtain the pattern of variation (machining pattern) of the to-be-determined acceleration/deceleration times tf1 and ts1 and the constant speed times tf2 and ts2, in other words, the sequence of the machining, the set speeds, etc.

At step S3, the acceleration/deceleration time tf1 of the motor 10f according to the acceleration/deceleration time constant tf and the acceleration/deceleration time ts1 of the motor 10s according to the acceleration/deceleration time constant ts are calculated by the above-mentioned processing executed in the acceleration/deceleration time calculating portion 22. In this case, the acceleration/deceleration times tf1 and ts1 are calculated considering whether the displacement X is larger than $vf^2/af$ or not as described above.

At step S4, the constant speed times tf2 and ts2 of the respective motors 10f, 10s according to the acceleration/deceleration time constants tf and ts are calculated, by the above-mentioned processing executed in the constant speed rotation time calculating portion 23.

At step S5, the cycle time T required to machine the workpiece 14 according to the acceleration/deceleration time constants tf and ts is calculated, by the above-mentioned processing executed in the cycle time calculating portion 24. The calculated cycle time T is stored in the memory.

At step S6, the power consumptions Em (the first power consumption) of the respective motors 10f, 10s in the cycle time T are calculated, by the above-mentioned processing executed in the first power consumption calculating portion 25.

At step S7, the power consumption E0 (the second power consumption) of the peripheral equipment 17 in the cycle time T is calculated, by the above-mentioned processing executed in the second power consumption calculating portion 26.

At step S8, the total power consumption E of the machine tool, as a whole, in the cycle time T is calculated, by the above-mentioned processing executed in the total power consumption calculating portion 27. The calculated total power consumption E is stored in the memory.

At step S9, whether the acceleration/deceleration time constants tf and ts are equal to the upper limit value tmax or not is checked. If the tf and ts are not equal to the upper limit value tmax, the control proceeds to step S10.

At step S10, the predetermined time constant increment Δt is added to the current acceleration/deceleration time constants tf and ts, and the obtained values are set as new acceleration/deceleration time constants tf and ts, respectively, and thereafter the control returns to step S3. The processing in step S3 to step S8, are repeated using the new time constants tf and ts.

If it is judged that the time constants tf and ts are equal to the upper limit value tmax in step S9, the control proceeds to step S11. At step S11, the acceleration/deceleration time constants tf and ts to minimize total power consumption E are determined, using the total power consumption E stored in the memory, by the above-mentioned processing executed in the acceleration/deceleration time constant selecting portion 28. Thereafter, the determined time constants tf and ts are set as the target time constant ta, and the routine terminates. The termination of the routine may be informed, for example, by lighting a lamp, etc. Thus, an operator can start machining the workpiece 14 at an appropriate time.

The operations in the control device according to the embodiment are summarized as follows. For example, when the target time constant ta is set based on the machining program shown in FIG. 3, at first, the acceleration/deceleration times tf1, ts1 and the constant speed times tf2 and ts2 are calculated using the time constants tf and ts as parameters, and the cycle time T is calculated (step S3 to step S5). Then, using these calculated values, the power consumptions Em of the motors 10f, 10s are calculated (step S6). Furthermore, the power consumption E0 of the peripheral equipment 17 is calculated (step S7).

These calculations are performed each time the time constants tf and ts are varied by the predetermined increment Δt from the lower limit value tmin to the upper limit value tmax, then, specific characteristic curves (FIG. 5) showing the relationship between the acceleration/deceleration time constants tf and ts and the total power consumption E and the cycle time T are obtained. From the characteristic curves, the time constants tf and ts to minimize total power consumption E are determined and are set as the target time constant ta (step S11). Using this target time constant ta, the acceleration/deceleration times tf1 and ts1 and the constant speed times tf2 and ts2 when the machining is carried out according to the machining program are determined. The motors 10f, 10s are controlled based on the determined acceleration/deceleration times tf1 and ts1 and constant speed times tf2 and ts2, respectively, to machine the workpiece 14.

According to the embodiment, the following operation and effect can be brought about.

(1) The power consumptions Em of the motors 10f, 10s are predicted and calculated using the acceleration/deceleration time constants tf and ts as parameters, and the power consumption E0 of the peripheral equipment 17 is predicted and calculated by multiplying the power P0 of the peripheral equipment 17 per unit time by the cycle time T. The target time constant ta is set so that the total power consumption E which is the summation of the power consumptions Em and E0 is minimized, and acceleration/deceleration of the motors 10f, 10s are controlled based on the target time constant ta. Consequently, the driving of the motors 10f and 10s can be optimally controlled, considering all of the total power consumption Em of the machine tool.

(2) The motors 10f and 10s are controlled so that the total power consumption E is minimized and as a result, the power consumption E is minimized, resulting in the most effective power-saving.

Figure 7:
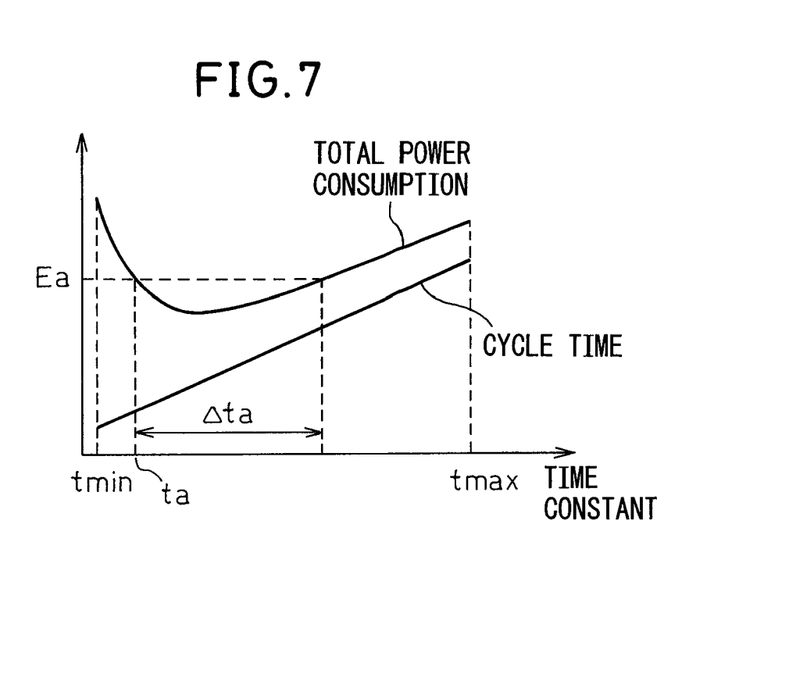
FIG. 7 is a diagram showing a variant of FIG. 5.

In the above-mentioned embodiment, the target time constant ta is set in the acceleration/deceleration time constant selecting portion 28 so that the total power consumption E is minimized, however, the setting of the time constant ta is not limited thereto. For example, a limit value Ea of the total power consumption E is set as shown in FIG. 7, and a time constant to minimize the cycle time T may be selected as the target time constant ta from among the time constants Δta within the limit value Ea. As a result, it is possible to perform the machining operation within a short cycle time T, while restricting the power consumption E, thus the workpiece 14 can be machined efficiently.

When it is assumed that a function to express the relationship between the acceleration/deceleration time constants tf, ts and the total power consumption E is f(t), a function to express the relationship between the acceleration/deceleration time constants tf, ts and the cycle time T is g(t), and a function to add these functions is P(t), it may be possible to set the time constants tf and ts to minimize P(t) as the target time constant ta. In such a case, P(t) may be calculated by the following formula (XI), using coefficients k1, k2 (>0).

$$P(t)=k1 \times f(t)+k2 \times g(t) \quad (XI)$$

Figure 8:
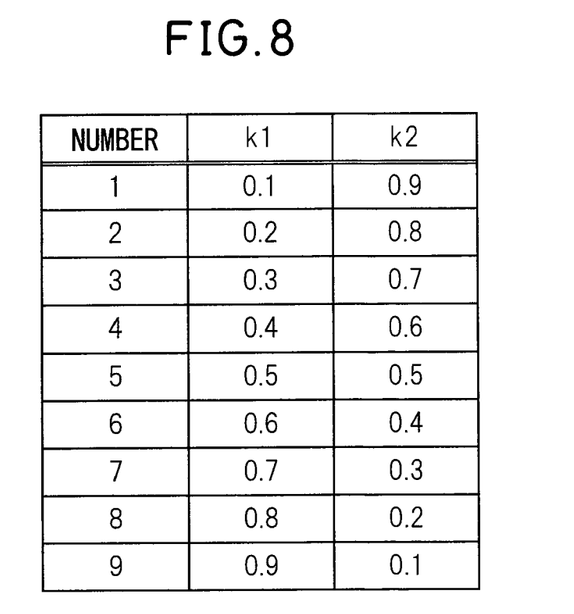
FIG. 8 is a table showing a relationship between coefficients used to determine a time constant in the variant.

The coefficients k1, k2 in the above mentioned formula (XI), for example, can be selected according to the purpose from among various combinations of the coefficients shown in FIG. 8. Consequently, it is possible to make the weights of the total power consumption E and cycle time T variable in order to obtain an optimum value of P(t). Alternatively, the time constant may be selected from among ta shown in FIG. 5 and ta shown in FIG. 7 by the operator.

The proportion of the constant rotation time ts2 to the cycle time T is larger in the spindle motor 10s than in the feed axis motor 10f. In view of this fact, if the acceleration/deceleration time ts1 is short enough to be negligible compared with the constant rotation time ts2, the spindle motor 10s can be regarded as equipment which operates at a constant power, and accordingly it is possible to calculate only the power consumption Em of the feed axis motor 10f in the first power consumption calculating portion 25 as the first power consumption calculating portion. Consequently, it is possible to calculate the power consumption Em of the spindle motor 10s in the second power consumption calculating portion 26 as the second power consumption calculating portion, and include the calculated power consumption Em in the power consumption E0 of the peripheral equipment. Not only the oil pump and the spindle motor 10s but also other devices operated at a constant power (for example, sensor, light, etc.) can be included in the peripheral equipment 17. Note that, the feed axis motor in the present invention includes not only the feed axis motor 10f of which feed speed in the axial direction varies, but also the spindle motor 10s of which the rotating feed speed varies.

In the above-mentioned embodiment, acceleration/deceleration of the motors 10f, 10s are controlled to minimize the total power consumption E (FIG. 5) or to minimize the cycle time T in the range in which the total power consumption E is below the set value Ea (FIG. 7). However, the constitution of the motor control portion is not limited thereto, as long as the target time constant ta is determined based on the summation E of the first power consumption Em and the second power consumption E0, and the motors 10f, 10s are controlled based on this time constant ta. Only acceleration or only deceleration of the motors 10f, 10s may be controlled.

In the above-mentioned embodiment, the first power consumption Em is calculated using the times necessary for the feed shaft speed and the spindle speed to reach the set speeds of and vs as the acceleration/deceleration time constants tf and ts, respectively. However, the first power consumption Em may be calculated using other time constants correlated with at least one of the acceleration time and the deceleration time of the feed axis motor 10f. The second power consumption E0 is calculated based on the cycle time T. However, the calculation of the cycle time T varies depending on the machining program. Therefore, the constitution of the cycle time calculating portion 24 is not limited to the above-mentioned embodiment.

In the above-mentioned embodiment, the total power consumption and the cycle time according to the acceleration/deceleration time constants tf and ts are calculated and predicted using various data preset in the data setting portion 21. However, actual data obtained when the machining program is actually executed, may be used for the calculation of the total power consumption and the cycle time.

In the above-mentioned embodiment, the control device according to the embodiment of the present invention is applied to a machining center. However, the control device of the present invention is also applicable to other machine tools having a feed axis motor.

According to the present invention, the total power consumption of the machine tool, is reduced optimally because the target time constant correlated with at least one of the acceleration time and deceleration time of the feed axis motor is determined based on the summation of the power consumption of the feed axis motor and the power consumption of equipment operated at a constant power, and the feed axis motor is controlled based on the target time constant.

While the invention has been described with reference to specific preferred embodiments, it will be understood, by those skilled in the art, that various changes or modifications may be made thereto without departing from the scope of the following claims.

The invention claimed is:

1. A control device of a machine tool, comprising:
 a feed axis driving motor;
 a spindle driving motor;
 a first power consumption calculating portion calculating power consumption of the feed axis driving motor or the spindle driving motor, using a time constant correlated with at least one of acceleration time and deceleration time of the feed axis driving motor or the spindle driving motor as a parameter;
 a cycle time calculating portion calculating a cycle time for machining a workpiece, the cycle time varying according to the time constant;
 a second power consumption calculating portion calculating power consumption of equipment provided at the machine tool and adapted to be operated by a constant power, based on the cycle time calculated by the cycle time calculating portion; and
 a motor control portion determining a target time constant based on a summation of the power consumption calculated by the first power consumption calculating portion and the power consumption calculated by the second power consumption calculating portion, and controlling the feed axis driving motor or the spindle driving motor based on the target time constant.

2. The control device of claim 1, wherein the motor control portion controls at least one of acceleration and deceleration of the feed axis driving motor or the spindle driving motor so that the summation of the power consumption calculated by the first power consumption calculating portion and the power consumption calculated by the second power consumption calculating portion is a minimum value when the workpiece is machined by operating the equipment operated by the constant power and driving the feed axis driving motor or the spindle driving motor.

3. The control device of claim 1, wherein the motor control portion controls at least one of acceleration and deceleration of the feed axis driving motor or the spindle driving motor so that the cycle time calculated by the cycle time calculating portion is a minimum value in a range in which the summation of the power consumption calculated by the first power consumption calculating portion and the power consumption calculated by the second power consumption calculating portion is equal to or less than a preset value when the workpiece is machined by operating the equipment operated by the constant power and driving the feed axis driving motor or the spindle driving motor.

* * * * *